(12) United States Patent
Shiraishi

(10) Patent No.: US 11,897,821 B2
(45) Date of Patent: Feb. 13, 2024

(54) CERAMIC PRODUCT

(71) Applicant: SAGA PREFECTURE, Saga (JP)

(72) Inventor: Atsunori Shiraishi, Saga (JP)

(73) Assignee: SAGA PREFECTURE, Saga (JP)

( * ) Notice: Subject to any disclaimer, the term of this patent is extended or adjusted under 35 U.S.C. 154(b) by 0 days.

(21) Appl. No.: 17/946,830

(22) Filed: Sep. 16, 2022

(65) Prior Publication Data

US 2023/0029091 A1 Jan. 26, 2023

Related U.S. Application Data

(62) Division of application No. 16/962,399, filed as application No. PCT/JP2018/039690 on Oct. 25, 2018, now Pat. No. 11,479,514.

(30) Foreign Application Priority Data

Jan. 19, 2018 (JP) .................................. 2018-006993

(51) Int. Cl.
*C04B 41/86* (2006.01)
*C03C 8/02* (2006.01)
*C03C 8/20* (2006.01)
*C04B 41/50* (2006.01)

(52) U.S. Cl.
CPC ................ *C04B 41/86* (2013.01); *C03C 8/02* (2013.01); *C03C 8/20* (2013.01); *C04B 41/5022* (2013.01)

(58) Field of Classification Search
CPC ..... C04B 41/86; C04B 41/5022; C04B 33/34; C03C 8/02; C03C 8/20; C03C 8/14; C03C 8/18
See application file for complete search history.

(56) References Cited

U.S. PATENT DOCUMENTS

2007/0265154 A1 * 11/2007 Baldwin ................... C03C 8/22
501/16

* cited by examiner

*Primary Examiner* — Karl E Group
*Assistant Examiner* — Cameron K Miller
(74) *Attorney, Agent, or Firm* — Manabu Kanesaka

(57) ABSTRACT

A ceramic product includes a glass layer having 0.1 wt % to 9 wt % of a luster pigment for providing a metallic look. The glass layer includes 40 wt % to 60 wt % of silicon dioxide, 15 wt % to 35 wt % of boron oxide, 18 wt % or less of one or more alkali metal oxides selected from the group consisting of lithium oxide, sodium oxide, and potassium oxide, 4 wt % or less of one or more alkali metal oxides selected from lithium oxide and sodium oxide, and 5 wt % or more of potassium oxide.

7 Claims, 6 Drawing Sheets

CERAMIC PRODUCT

CROSS-REFERENCE TO RELATED APPLICATION

The present application is a divisional application of Ser. No. 16/962,399 filed on Jul. 15, 2020, which is a National Phase of International Application No. PCT/JP2018/039690 filed Oct. 25, 2018, and claims priority from Japanese Application No. 2018-006993 filed Jan. 19, 2018, the disclosure of which is hereby incorporated by reference herein in its entirety.

TECHNICAL FIELD

The present invention relates to overglaze decoration materials (overglaze colors) that can form a vitreous layer (overglaze layer) having metallic luster properties and gloss, as well as ceramic products using such overglaze decoration materials (overglaze colors), and production methods thereof.

BACKGROUND ART

In recent years, metallic painting is increasingly employed in paints for automobiles, smart phones, home electronics and other products. Such metallic painting used in each of these products uses a paint composed of a base resin component and a luster pigment added to the resin component for adding a metallic look to the paint. Such luster pigments include flake-shaped fine particles (plate-shaped particles) coated with titanium oxide or ferric oxide as a high refractive index treatment. These particles are randomly embedded in the coating film and reflect incident light in various directions, thus providing the metallic look.

Attempts have been made to also apply such metallic looks to ceramic products. For example, Patent Document 1 (JP-A-2005-320183) discloses a ceramic having a raised layer formed of a translucent glass material that has a light-scattering filler mixed therein for scattering light to provide a pearl-like texture.
Patent Document 1: JP-A-2005-320183

SUMMARY OF INVENTION

Technical Problem

In manufacturing ceramic products having a metallic appearance, a coating material serving as an overglaze containing an added luster pigment that provides a metallic look is applied to a substrate, which is then fired. However, such luster pigments tend to melt in high temperature glass and lose their metallic look upon firing.

Thus, when typical frit (glass) used in ceramics is used to produce a metallic overglaze, the luster pigments will melt in the frit and the resulting overglaze may not have the desired metallic look.

On the other hand, ceramic products using gold mica overglazes and silver mica overglazes are traditionally produced as ceramic products using luster pigments. These overglazes contain relatively large amounts of luster pigments (as much as 10 to 20 wt %) to correspondingly decrease the proportion of glass present in the overglaze so that the luster pigments are less likely to dissolve in the glass.

While these gold and silver mica overglazes possess a certain degree of metallic luster as they use the same luster pigments as those used in the metallic paints, these overglazes can provide only limited surface gloss and result in a matte-like texture due to less amounts of glass available to cover the surface of the overglaze to provide the surface gloss and due to numerous mica crystals that are present on the surface of the overglaze.

Another drawback with the gold and silver mica overglazes is that their surfaces are likely to accumulate dirt and grime due to small quantity of glass components covering the surface of the overglazes and these accumulated dirt and grime are difficult to remove. In particular, when the overglazes are used in eating utensils, oil stains from food are likely to stand out, making the appearance of the eating utensils unattractive.

Solution to Problem

The present invention addresses the above-identified problems and thus, an overglaze decoration material in accordance with the present invention may include a frit that has a composition thereof including 40 wt % to 60 wt % of silicon dioxide, 15 wt % to 35 wt % of boron oxide, and 18 wt % or less of one or more alkali metal oxides selected from the group consisting of lithium oxide, sodium oxide, and potassium oxide; and a luster pigment for providing a metallic look.

The overglaze decoration material in accordance with the present invention may contain, for example, 0.1 wt % to 9 wt % of the luster pigment, with the remainder being the frit.

The overglaze decoration material in accordance with the present invention may contain, for example, 0.1 wt % to 9 wt % of the luster pigment and a non-luster pigment, with the remainder being the frit.

The overglaze decoration material in accordance with the present invention may contain, for example, 0.1 wt % to 9 wt % of the luster pigment and a chromogenic metal compound, with the remainder being the frit.

In the overglaze decoration material in accordance with the present invention, the luster pigment may contain, for example, plate-shaped particles, and/or plate-shaped particles coated with one or more oxides selected from the group consisting of titanium oxide, ferric oxide, silicon oxide, tin oxide, and zirconium oxide.

In the overglaze decoration material in accordance with the present invention, the plate-shaped particles may be, for example, one or more selected from the group consisting of mica, silicon oxide, aluminum oxide, and borosilicate glass.

A ceramic product in accordance with the present invention may include, for example, a glass layer containing 0.1 wt % to 9 wt % of a luster pigment for providing a metallic look.

In the ceramic product in accordance with the present invention, the glass layer may contain, for example, 40 wt % to 60 wt % of silicon dioxide, 15 wt % to 35 wt % of boron oxide, and 18 wt % or less of one or more alkali metal oxides selected from the group consisting of lithium oxide, sodium oxide, and potassium oxide.

In the ceramic product in accordance with the present invention, the glass layer may contain, for example, a non-luster pigment.

In the ceramic product in accordance with the present invention, the glass layer may contain, for example, a chromogenic metal compound.

In the ceramic product in accordance with the present invention, the luster pigment may contain, for example, plate-shaped particles, and/or plate-shaped particles coated with one or more oxides selected from the group consisting of titanium oxide, ferric oxide, silicon oxide, tin oxide, and zirconium oxide.

In the ceramic product in accordance with the present invention, the plate-shaped particles may be, for example, one or more selected from the group consisting of mica, silicon oxide, aluminum oxide, and borosilicate glass.

In the ceramic product in accordance with the present invention, the glass layer has a specular surface gloss value (Gs 60°) of 60 or higher, and the value of luminous reflectance Y at a light receiving angle of 30° is increased from the value of luminous reflectance Y at a light receiving angle of 0° in a variable angle luminous intensity distribution measured at an incident light angle of −45°.

A method for producing a ceramic product in accordance with the present invention may include the steps of preparing an overglaze decoration material containing a frit that has a composition thereof including 40 wt % to 60 wt % of silicon dioxide, 15 wt % to 35 wt % of boron oxide, and 18 wt % or less of one or more alkali metal oxides selected from the group consisting of lithium oxide, sodium oxide and potassium oxide, and a luster pigment for providing a metallic look; preparing a paste containing the overglaze decoration material; applying the paste to a substrate; and baking the substrate.

A method for producing a ceramic product in accordance with the present invention may include the steps of preparing an overglaze decoration material containing a frit that has a composition thereof including 40 wt % to 60 wt % of silicon dioxide, 15 wt % to 35 wt % of boron oxide, and 18 wt % or less of one or more alkali metal oxides selected from the group consisting of lithium oxide, sodium oxide and potassium oxide, a luster pigment for providing a metallic look, and a non-luster pigment; preparing a paste containing the overglaze decoration material; applying the paste to a substrate; and baking the substrate.

A method for producing a ceramic product in accordance with the present invention may include the steps of preparing an overglaze decoration material containing a frit that has a composition thereof including 40 wt % to 60 wt % of silicon dioxide, 15 wt % to 35 wt % of boron oxide, and 18 wt % or less of one or more alkali metal oxides selected from the group consisting of lithium oxide, sodium oxide and potassium oxide, a luster pigment for providing a metallic look, and a chromogenic metal compound; preparing a paste containing the overglaze decoration material; applying the paste to a substrate; and baking the substrate.

Advantageous Effects of Invention

According to the overglaze decoration material in accordance with the present invention as described above, the luster pigments do not dissolve in high temperature glass and can thus maintain their luster property at overglaze firing temperatures used for ceramic products (approximately 800° C.). As a result, ceramic products can be provided that have a metallic texture and have a luster overglaze with surface gloss applied thereto.

Further, the overglaze decoration material in accordance with the present invention enables provision of ceramic products having metallic luster that maintain a high surface gloss, are less likely to accumulate dirt and grime on the surface thereof, and that can be used as eating utensils.

Moreover, the ceramic products in accordance with the present invention are ceramic products that possess a "metallic" texture and have a luster overglaze with surface gloss applied thereto.

In addition, the production methods for the ceramic products in accordance with the present invention enable production of ceramic products that possess a "metallic" texture and have a luster overglaze with surface gloss applied thereto.

DETAILED DESCRIPTION OF THE INVENTION

Figure 1A:
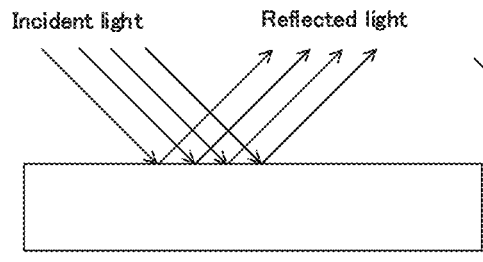
FIGS. 1(A) and 1(B) are diagrams illustrating the principle of how a luster pigment provides a metallic look.

The present invention will now be specifically described.

The present inventor has discovered that luster pigments for providing a metallic look tend to melt in high temperature glass and, at an overglaze firing temperature (about 800° C.) used for ceramic products, lose their luster properties that provide the metallic texture. Accordingly, the present inventor considered decreasing the fluxing power (the ability to dissolve a pigment) of glass in designing an overglaze decoration material (an overglaze) in accordance with the present invention and prepared a frit with a decreased flux power.

The present inventor also considered decreasing the flux power (the ability to dissolve a pigment) of the frit for use in the overglaze decoration material (an overglaze) in accordance with the present invention by decreasing the proportion of alkali metals or alkaline earth metals in the composition of the frit as compared to the composition of a typical frit (glass) such as commercially available frits used in overglazes. Given that the amounts of alkali metals or alkaline earth metals were decreased, the present inventor further considered their specific breakdown proportions.

For commercially available frits, a general technical approach for improving the flux power has been developed. According to this approach, lighter elements, such as Li and Na, of alkaline metals are increased whereas K, a heavier element, is decreased. Conversely, lighter elements, such as Ca, of alkaline earth metals is increased whereas heavier elements, such as Ba, is increased. In preparing frits for use in the present invention, the present inventor examined the opposite approach to the above-described technical approach.

In the overglaze decoration material in accordance with the present invention, for alkali metals, lighter elements such as Li and Na are decreased whereas heavier elements such as K is increased. Although alkali metal oxides are added with the aim of lowering the melting point, alkali metal oxides such as $Li_2O$ (lithium oxide) and $Na_2O$ (sodium oxide) also act to facilitate efficient dissolution of the luster pigments, which must be considered in designing the composition of the frit. More specifically, one or more alkali metal oxides selected from $Li_2O$ and $Na_2O$ is advantageously added to the frit in an amount of 4 wt % or less. The amount of the alkali metal oxide is preferably 3.5 wt % or less, more preferably 3.1 wt % or less with 0 wt % inclusive.

On the other hand, since alkali metal oxides also contribute to lowering the melting point and also to increasing chemical stability and durability, $K_2O$ (potassium oxide) is typically added to the frit in an amount of 3 wt % or higher. Thus, the amount of $K_2O$ is preferably 5 wt % or more, more preferably 6.7 wt % or more.

Alkaline earth metal oxides are added to the frit to cause vitrification. For alkaline earth metals used in the overglaze decoration material according to the present invention, lighter elements such as Ca are increased and heavier elements such as Ba are decreased in the preparation of frit. While the frit prepared in such a manner will have a suitable composition for use in the overglaze decoration material, the optimal amount of CaO will vary depending on the proportions of alkali metal oxides, alkaline earth metal oxide, and zinc oxide.

Thus, the amount of CaO (calcium oxide) in the frit is preferably 0.5 wt % or more, more preferably 1 wt % or more. The amount of CaO may be 0 wt % or more, however. In the present embodiment, CaO intentionally excluded from the composition of the frit is also counted.

BaO (barium oxide) may be added to the frit in an amount of 9 wt % or less. The amount of BaO is preferably 7 wt % or less, more preferably 5 wt % or less with 0 wt % inclusive.

While lighter elements, such as Ca, of alkaline earth metals are increased and heavier elements, such as Ba, are decreased in the overglaze decoration material in accordance with the present invention, the amounts of both CaO and BaO may be 0 wt % if the amount of at least one alkali metal oxide selected from the group consisting of $Li_2O$ and $Na_2O$ is close to 4 wt %, the upper limit.

When BaO in the frit composition is 0 wt %, SrO (strontium oxide) may be added instead.

Silicon dioxide ($SiO^2$), the major component of the overglaze decoration material in accordance with the present invention, may be added in an amount of 40 wt % to 60 wt %. The amount of $SiO_2$ is preferably 42 wt % to 57 wt %, more preferably 43.7 wt % to 54.1 wt %. If the amount is less than 40 wt %, then the proportions of the alkali metals and the alkaline earth metals in the frit composition increase correspondingly, as does the fluxing power, thereby increasing the likelihood of dissolving the luster pigments. If the amount exceeds 60 wt % or more, then the melting point of the frit increases and the dissolution of overglaze at the firing temperature of 800° C. becomes insufficient, thus leading to the loss of gloss in the overglaze.

$B_2O_3$ (boron oxide) is added to the frit to lower the melting temperature of the frit. $B_2O_3$ may be added in an amount of 15 wt % to 35 wt % of the frit composition. The amount of $B_2O_3$ is preferably 18 wt % to 33 wt %, more preferably 21.7 wt % to 29 wt %. If the amount is less than 15 wt %, then the melting point of the frit increases and the dissolution of overglaze at the firing temperature of 800° C. becomes insufficient, thus leading to the loss of gloss in the overglaze. If the amount exceeds 35 wt %, then the fluxing power increases, increasing the likelihood of dissolving the luster pigments.

$Al_2O_3$ (aluminum oxide) is used to modify the $SiO_2$ framework as the frit is formed. When added in a suitable amount, aluminum oxide improves the acid resistance of glass. While frit can still be formed even if the amount of $Al_2O_3$ is 0 wt %, $Al_2O_3$ may be added in an amount of 8 wt % or less of the frit composition. The amount of $Al_2O_3$ is preferably 8 wt % or less, more preferably 0.2 wt % to 6.3 wt %. If the amount exceeds 10 wt %, then the melting point increases and the frit may undergo devitrification.

ZnO (Zinc Oxide) is added in the form of oxide to lower the melting point and impart chemical stability. ZnO may be added in an amount of 10 wt % or less of the frit composition. The amount of ZnO is preferably 2 wt % to 6 wt %, more preferably 3.0 wt % to 4.3 wt %. If the amount exceeds 10 wt %, then the chemical resistance may be deteriorated.

$ZrO_2$ (zirconium dioxide) is added to the frit with the aim of imparting acid resistance and chemical stability. $ZrO_2$ may be added in an amount of 10 wt % or less of the frit composition. The amount of $ZrO_2$ is preferably 2 wt % to 8 wt %, more preferably 4.9 wt % to 5.3 wt %. If the amount exceeds 10 wt %, the melting temperature is increased and the frit may undergo devitrification.

The frit composition as described above in the overglaze decoration material in accordance with the present invention serves to decrease the flux power (ability to dissolve pigments) of glass and avoid significant changes from the melting point and thermal expansion coefficient from conventional frits for overglazes.

The base composition for the frit composition as described above is mainly composed of $SiO_2$, $B_2O_3$, and alkali metal oxides while the other components may be suitably adjusted as desired. Accordingly, the composition of frit is defined in the scope of claims of the present invention by silicon dioxide, boron oxide, and alkali metal oxides (such as lithium oxide, sodium oxide, and potassium oxide).

In the frit composition for use in the present invention, at least one alkali metal oxide selected from the group consisting of lithium oxide, sodium oxide, and potassium oxide may be added in an amount of 18 wt % or less. Thus, the amount of alkali metal oxides is preferably 15 wt % or less, more preferably 13.7 wt % or less.

It should be noted that while the components of the frit (CaO, BaO, SrO, $Al_2O_3$, and $ZrO_2$) have been described specifically, they are only illustrative. Though any numerical ranges are not particularly defined for alkaline earth metals in the scope of claims of the present specification, they are also important as frameworks for glass.

In the overglaze decoration material in accordance with the present invention, a luster pigment for providing a metallic look is added to the frit having a composition as described above in an amount of 0.1 wt % to 9 wt %. The amount of the luster pigment is preferably 0.2 wt % to 8 wt %, more preferably 0.3 wt % to 8 wt %. The luster pigment does not provide the luster properties when added in amounts less than 0.1 wt %. Conversely, if the amount of the luster pigment is increased to more than 9 wt %, then the amount of glass available to cover the overglaze surface and provide gloss is decreased and the abundant luster pigment present in the overglaze surface leads to decreased surface gloss and a matte-like texture.

The luster pigment for use in the overglaze decoration material in accordance with the present invention preferably contains plate-shaped particles (flake-shaped fine particles) by themselves or plate-shaped particles (flake-shaped fine particles) coated with one or more oxides selected from titanium oxide, ferric oxide, silicon oxide, tin oxide, and zirconium oxide. In such a case, the luster pigment may contain both plate-shaped particles (flake-shaped fine particles) by themselves without coating and plate-shaped particles (flake-shaped fine particles) coated with the oxide, or either one of plate-shaped particles (flake-shaped fine particles) by themselves without coating or plate-shaped particles (flake-shaped fine particles) coated with the oxide. The plate-shaped particles are preferably one or more of mica, silicon oxide, aluminum oxide and borosilicate glass.

An overglaze decoration material (a luster overglaze painting) was prepared by adding 0.3 to 8 wt % of the luster pigment to the frit having a composition as described above. The overglaze decoration material was then applied to the surface of a ceramic and dried. Subsequently, the coated ceramic was fired at 750 to 830° C. to form an overglaze (the thickness of the overglaze layer (glass layer) after firing was about 0.05 to 0.2 mm). The resulting overglaze is characteristic in that the luster pigments do not dissolve in glass and can thus maintain their luster properties to provide a "metallic" texture and high surface gloss.

If the thickness of the overglaze layer (glass layer) after firing is less than 0.05 mm, then sufficient metallic luster properties may not be achieved. In contrast, if the thickness exceeds 0.2 mm, the metallic glitter properties of the overglaze layer (glass layer) may not be improved and the formed metallic overglaze layer (glass layer) becomes susceptible to peeling and cracking. The average particle size of the frit having a composition as described above is preferably from 5 to 20 microns in view of the workability upon application with brushes. The particles size distribution (size distribution) of the frit was determined by using LMS-2000e, a laser diffraction/scattering size distribution measurement instrument manufactured by Seishin Enterprise. In the measurement of the particles size distribution (size distribution) of the frit, the refractive index of the particle was set to 1.52 and the absorbance of the particles was set to 0. In the present specification, the d50 value based on the measurement as described above is used as a measure of the particle size distribution (size distribution) of the frit.

Ceramic products in accordance with the present invention having an overglaze comprising an overglaze decoration material in accordance with the present invention have a texture resembling metallic paintings that possesses surface gloss as well as luster, a characteristic not achieved by conventional overglazes. The surface gloss of the ceramic product in accordance with the present invention as evaluated by specular gloss (Gs 60°) of its surface is 60 or higher.

The luster property of ceramic products was evaluated by comparing the value of luminous reflectance Y at a light receiving angle of 0° with the value of luminous reflectance Y at a light receiving angle of 30° in the variable angle luminous intensity distribution measured at an incident light angle of −45°. Specifically, the ceramic products in accordance with the present invention have an increased value of luminous reflectance Y at a light receiving angle of 30° than the value of luminous reflectance Y at a light receiving angle of 0° in the variable angle luminous intensity distribution measured at an incident light angle of −45°.

The firing temperature during the production of the ceramic products in accordance with the present invention is the same as that used for conventional overglazes, namely, from about 750° C. to about 830° C.

Also, the luster of the ceramic products in accordance with the present invention may be varied by varying the size of the luster pigments. Furthermore, ceramic products having a wide range of metallic colored overglazes may be manufactured by adding, in addition to the luster pigments, other pigments (pigments other than the luster pigments), and chromogenic metal compounds.

The chromogenic metal compound (mostly metal oxide) as used herein is a metal compound that colors the glass layer (overglaze layer) by the color of the metal oxide itself, or by being ionized upon firing. Such chromogenic metal compounds include ferric oxide, chromium oxide, cobalt oxide, copper oxide, manganese dioxide, and copper carbonate.

The ceramic products having an overglaze applied thereto using the overglaze decoration material in accordance with the present invention do not haze or cause any other change in appearance, nor does their surface gloss change when they are immersed in a 4% aqueous acetic acid solution in an acid resistance test.

In addition, by adding 3 wt % or less of rare earth metal oxides such as lanthanum oxide to the overglaze decoration material in accordance with the present invention, the acid resistance may be further improved.

The overglaze decoration material in accordance with the present invention may be formed in the form of transfer paper.

Furthermore, according to the overglaze decoration material in accordance with the present invention, ceramic products having gold overglaze with surface gloss may be manufactured by using gold luster pigments containing plate-shaped particles (flake-shaped fine particles) surface-coated with ferric oxide. Such ceramic products have more intense surface gloss than the ceramic products fabricated using conventional mica gold overglazes and therefore have a similar texture to gold overglazes. Moreover, these ceramic products can be manufactured at a lower cost as compared to the ceramic products having a gold overglaze. In addition, the ceramic products in accordance with the present invention do not have electroconductivity and thus allows use of a microwave oven. As opposed to gold overglazes that are softer than glass and tend to result in coming off of gold during washing, the ceramic products in accordance with the present invention are more strongly fixed and thus, more resistant to washing than gold overglazes due to the abundance of glass.

The overglaze decoration materials (luster overglaze paintings) in accordance with the present invention may be used in decorating not only ceramics, but also glass products and enameled products.

According to the overglaze decoration material in accordance with the present invention as described above, luster pigments do not dissolve in high temperature glass and can thus maintain their luster property at overglaze firing temperatures used for ceramic products (approximately 800° C.) As a result, ceramic products can be provided that have a metallic texture and have a luster overglaze with surface gloss applied thereto.

Further, the overglaze decoration material in accordance with the present invention enables provision of ceramic products having metallic luster that maintain a high surface gloss, are less likely to accumulate dirt and grime on the surface thereof, and that can be used as eating utensils.

Moreover, the ceramic products in accordance with the present invention are ceramic products that possess a "metallic" texture and have a luster overglaze with surface gloss applied thereto.

In addition, the production methods for the ceramic products in accordance with the present invention enable production of ceramic products that possess a "metallic" texture and have a luster overglaze with surface gloss applied thereto.

EXAMPLES

Figure 1B:
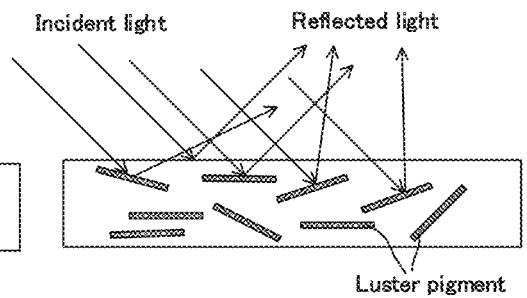

First, luster properties will be described. FIGS. 1(A) and 1(B) illustrate the manner in which a luster pigment provides metallic look, wherein FIG. 1A schematically depicts an overglaze sample with no metallic luster, and FIG. 1B schematically depicts an overglaze sample containing the luster pigment. In the case of the overglaze sample of FIG. 1A, the incident light is mostly reflected by specular reflection. In contrast, in the case of the overglaze sample of FIG. 1B, the highly reflective plate-shaped particles (luster pigment) oriented in various directions reflect the incident light in various angles and scatter the specular component. As a result, a "metallic" look can be provided.

In the present Examples, the variable angle luminous intensity distribution was measured to evaluate the metallic look as described above. At present, no JIS standards or other industrial standards such as in the painting industry exist for evaluation of the metallic look.

Figure 2:
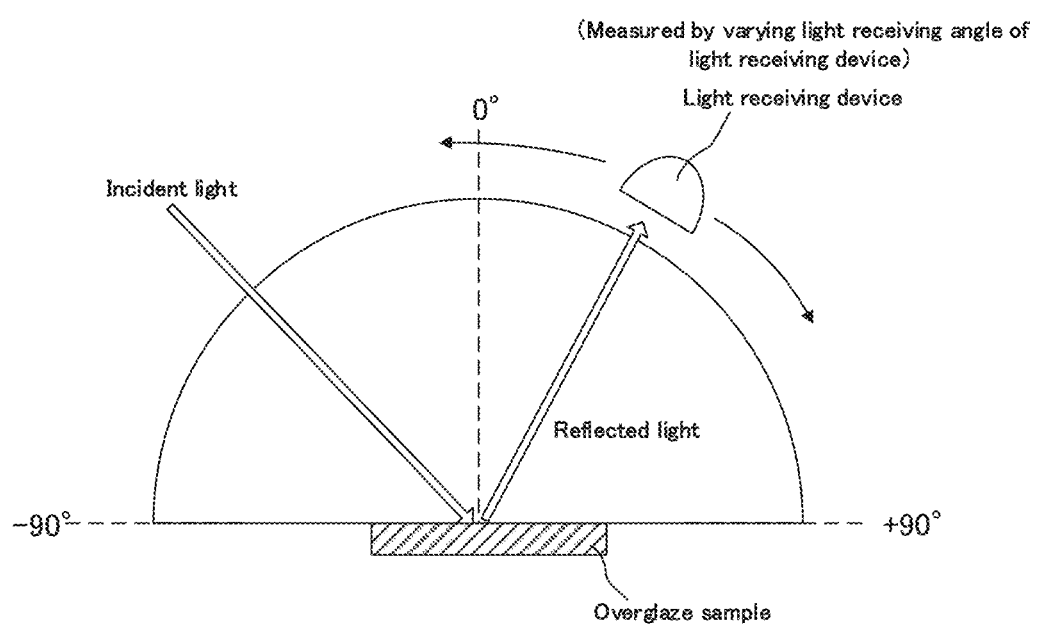
FIG. 2 illustrates the outline of a system for measuring the variable angle luminous intensity distribution.

The principles of measuring the variable angle luminous intensity distribution utilize the fact that the overglaze sample having metallic glitter properties have varying intensity of reflected light and thus, different glitter looks depending on the angles at which light is incident and the angles at which light is received (viewing angle). FIG. 2 illustrates the outline of a system for measuring the variable angle luminous intensity distribution. As shown in FIG. 2, the angle of incident light is fixed while the position of the light receiving device is changed to vary the light receiving angle. The luminous reflectance Y; XYZ color space (CIE 1931 color space) is then measured to observe changes. In the present examples, a variable angle spectrophotometer GC 5000 manufactured by Nippon Denshoku Industries was used. Specifically, light was irradiated onto the surface of the overglaze sample at an incident angle of −45° and the luminous reflectance (Y) was measured by varying the light receiving angle from −20° to 80° at 5-degree increments.

In the present examples, the presence or absence of the metallic luster property is determined by comparing the value of the luminous reflectance Y at a light receiving angle of 0° with the value of the luminous reflectance Y at a light receiving angle of 30° in the variable angle luminous intensity distribution measured at an incident light angle of −45°, and determining whether or not the value of the luminous reflectance Y at a light receiving angle of 30° (also referred to as "reflectance at 30° light receiving angle") is increased from the value of the luminous reflectance Y at a light receiving angle of 0° (also referred to as "reflectance at 0° light receiving angle").

Figure 3:
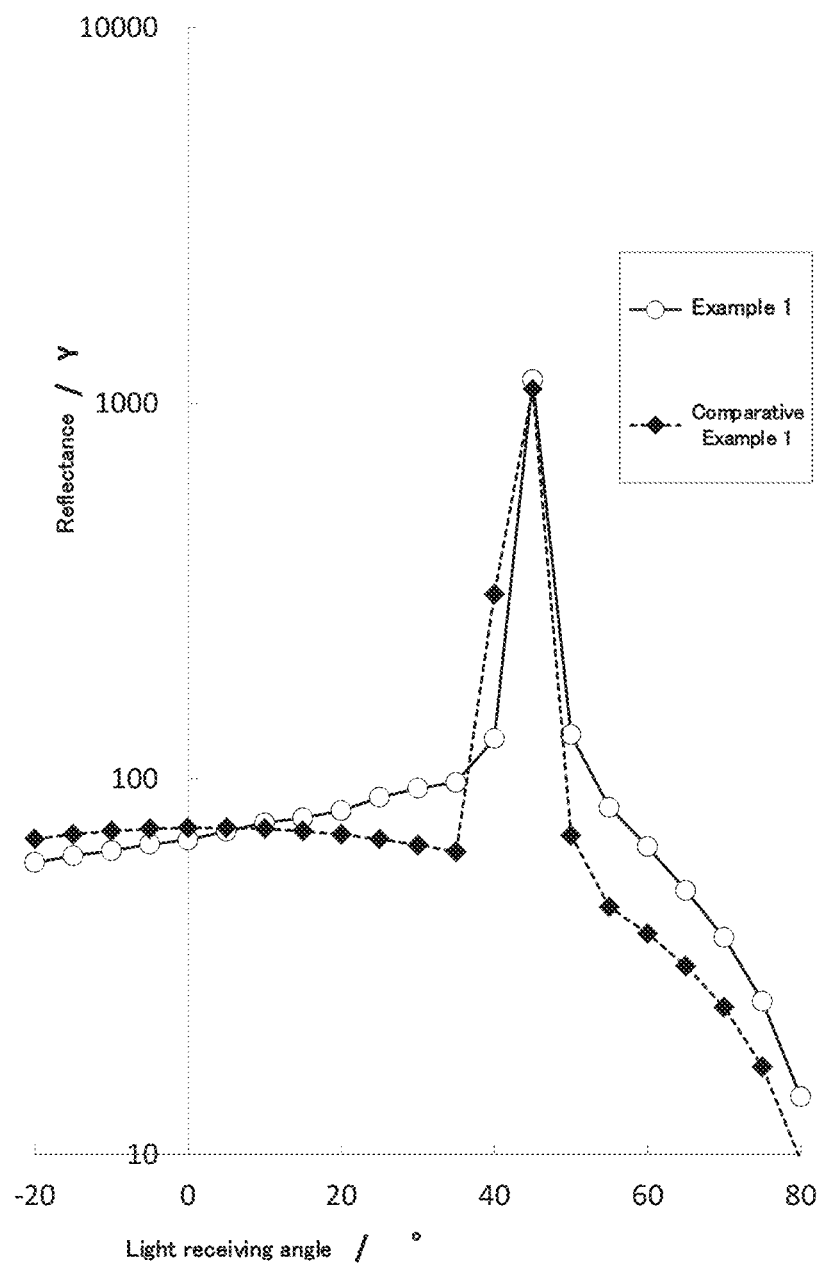
FIG. 3 is a diagram showing the results of measurement of the variable angle luminous intensity distribution.
Figure 4:
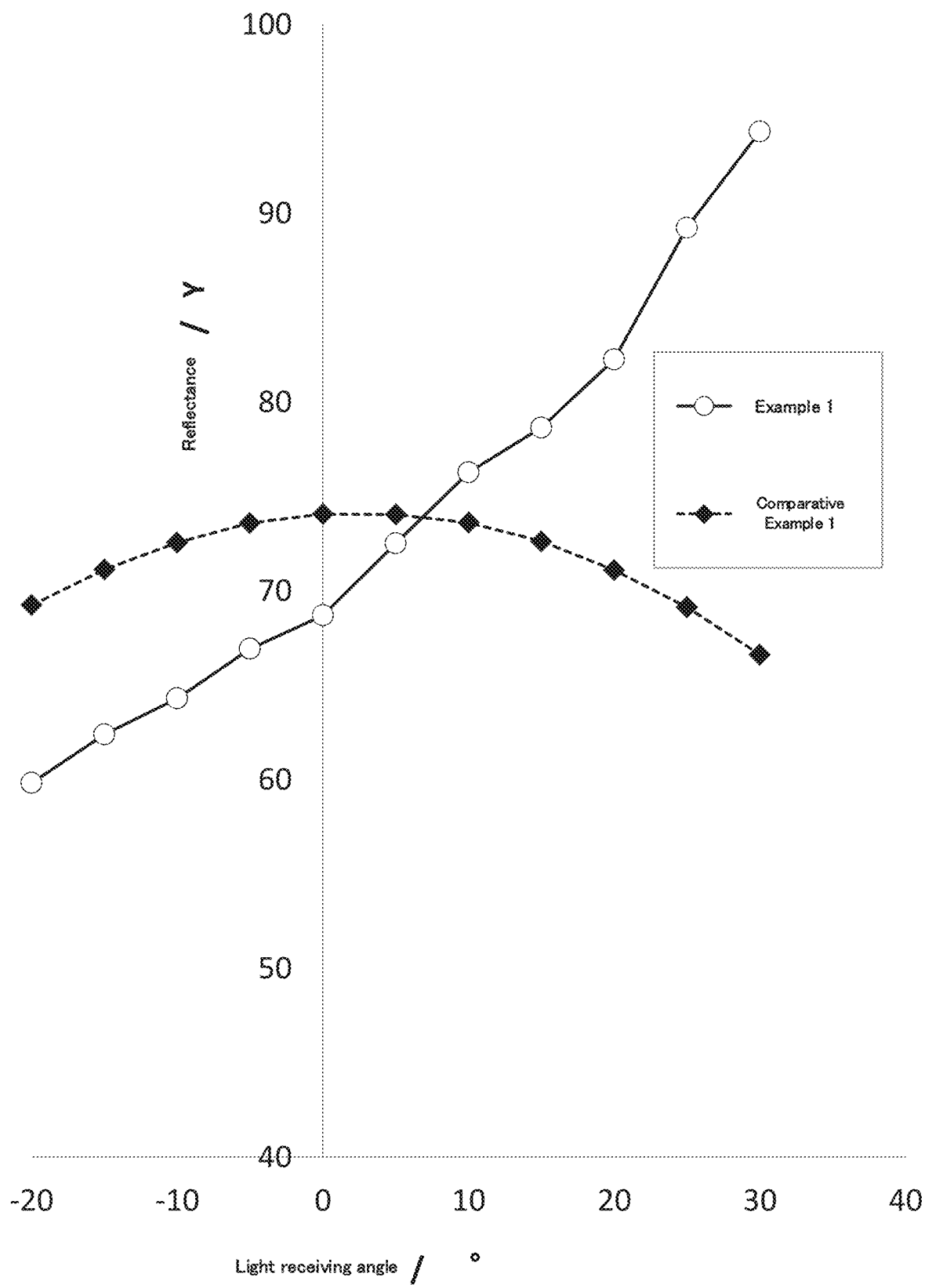
FIG. 4 is a partial enlarged view of FIG. 3.

FIG. 3 shows the results of the measurement of variable angle luminous intensity distribution for the manufactured metallic overglaze sample (Example 1) and a typical lusterless overglaze sample (Comparative Example 1). FIG. 4 is an enlarged view of a part of FIG. 3 ranging from −20 to 30°.

As can be seen, the luster pigment-free overglaze sample (Comparative Example 1) has a maximum reflectance at around 0° within the range from −20° to 30° (before the peak at 40 to 50° by specular reflection) and slightly decreasing reflectance toward 30°, whereas the overglaze sample containing the luster pigment (Example 1) has reflectance that increases toward 30° with increasing light receiving angle (FIG. 4). This is because highly reflective plate-shaped luster pigments present in the overglaze (glass) are oriented at various angles in the overglaze (glass) and scatter the specular component.

This indicates that, for the incident light angle of −45° in the measurement of variable angle luminous intensity distribution, the overglaze sample having a metallic luster property has a higher reflectance at the light receiving angle of 30° than the reflectance at the light receiving angle of 0°. In other words, for the incident light angle of −45° in the measurement of variable angle luminous intensity distribution, an overglaze sample having a reflectance higher at a light receiving angle of 30° than at a light receiving angle of 0° can be said to have a metallic luster property.

While the magnitude of reflectance itself may be related to the intensity of luster, it is not related to the presence or absence of luster. Rather, the percent decrease or increase between the reflectance at a light receiving angle of 0° and the reflectance at a light receiving angle of 30° directly affects the metallic luster.

For this reason, the change in reflectance between light receiving angles of 0° and 30° ($Y_{(0\text{-}30)}$) was determined for an overglaze sample containing a luster pigment with metallic luster (Examples of the present invention) and for an overglaze sample without metallic luster (Comparative Examples) for comparison, according to the following equation:

$$Y_{(0\text{-}30)} = \{(Y_{(30)} - Y_{(0)})/Y_{(0)}\} \times 100$$

wherein $Y_{(0)}$=reflectance at light receiving angle of 0°, and $Y_{(30)}$=reflectance at light receiving angle of 30°.

The light receiving angles at which to measure the reflectance were selected to be 0° and 30° because, in the quality evaluation of metallic paintings performed in the painting industries (for evaluating the intensity of metallic look, rather than the presence or absence of metallic look), the luster (glitter) evaluation (quality evaluation) of metallic painting is often performed by measuring the variable angle luminous intensity distribution at −65°, −30°, 0°, 20°, and 30° for the −45° incident light angle to determine the luminous reflectance (Y) or the L* value of L*a*b* color space (brightness). The light receiving angles 0° and 30° used as a condition for this measurement procedure were therefore chosen.

The JIS-Z8741 standard is used in the present embodiment to measure the specular gloss (Gs 60°) on the surface of each overglaze sample.

In the following, Examples 1 through 20 were prepared as overglaze samples containing luster pigments (Examples of the present invention) and each measurement was performed on them. Of these Examples, Example 6 and Example 7 are each an overglaze sample containing both a luster pigment and a non-luster pigment. Example 13 is an overglaze sample containing both a luster pigment and a chromogenic metal compound. Examples 21 through 24 were each prepared as a ceramic product having an overglaze containing a luster pigment. In principle, optical measurement was not possible for Examples 21 through 24 and was not performed. Examples 21 through 24 were prepared to mainly confirm that ceramic products in accordance with the present invention are feasible.

Overglazes without metallic luster looks (Comparative Examples) were also prepared and each measurement was performed on them. Overview of Comparative Examples is as follows: Comparative Example 1 is an overglaze sample based only on a frit used in the present invention. Comparative Examples 2 and 3 are each an overglaze sample formed by adding a non-luster pigment to the frit used in the present invention. Comparative Example 4 is an overglaze sample formed by adding a luster pigment to a typical commercially available frit, which is not the frit used in the present invention. Comparative Example 5 is an overglaze sample based on a gold mica overglaze. Comparative Example 6 is an overglaze sample based on a silver mica overglaze.

Example 1

Frit 1 in Table 1 was prepared and 2 wt % of Luster Pigment A in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.15 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 72.8. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments. As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 37.3%.

Here,
(Percent change in reflectance between light receiving angles of 0° and 30°) $Y_{(0-30)} = \{(Y_{(30)} - Y_{(0)})/Y_{(0)}\} \times 100$
wherein $Y_{(0)}$=reflectance at light receiving angle of 0°, and $Y_{(30)}$=reflectance at light receiving angle of 30°.

Example 2

Frit 1 in Table 1 was prepared and 2 wt % of Luster Pigment B in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.10 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 70.9. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 14.3%.

Example 3

Frit 2 in Table 1 was prepared and 1 wt % of Luster Pigment C in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.10 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 73.7. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 15.1%.

Example 4

Frit 3 in Table 1 was prepared and 1 wt % of Luster Pigment D in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.08 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 64.1. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 3.1%.

Example 5

Frit 1 in Table 1 was prepared and 2 wt % of Luster Pigment E in Table 2 was added to the frit to prepare an overglaze paint for ceramics. To the overglaze paint, a resin (squeegee oil OS4330 manufactured by Goo Chemical) was added to form a paste, which was then processed into about 0.25 mm thick transfer paper by printing. The transfer paper was applied onto a surface of a ceramic and dried. Subsequently, the dried ceramic was fired by maintaining at 790° C. for 20 min in an electric furnace to form an overglaze (the overglaze layer was about 0.19 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 87.2. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 61.1%.

Example 6

Frit 1 in Table 1 was prepared. 2 wt % of Luster Pigment E in Table 2 and then 2 wt % of a commercially available yellow pigment for ceramics (zircon praseodymium yellow) were added to the frit to prepare an overglaze paint for ceramics. To the overglaze paint, a resin (squeegee oil OS4330 manufactured by Goo Chemical) was added to form a paste, which was then processed into about 0.18 mm thick transfer paper by printing. The transfer paper was applied onto a surface of a ceramic and dried. Subsequently, the dried ceramic was fired by maintaining at 820° C. for 5 min in an electric furnace to form an overglaze (the overglaze layer was about 0.15 mm thick). The resulting overglaze was yellow in color and had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 83.3. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 47.5%.

Example 7

Frit 1 in Table 1 was prepared. 2 wt % of Luster Pigment E in Table 2 and then 2 wt % of a commercially available blue pigment for ceramics were added to the frit to prepare an overglaze paint for ceramics. To the overglaze paint, a resin (squeegee oil OS4330 manufactured by Goo Chemical) was added to form a paste, which was then processed into about 0.18 mm thick transfer paper by printing. The transfer paper was applied onto a surface of a ceramic and dried. Subsequently, the dried ceramic was fired by maintaining at 800° C. for 20 min in an electric furnace to form an overglaze (the overglaze layer was about 0.15 mm thick). The resulting overglaze was blue in color and had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 88.4. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 59.4%.

Example 8

Frit 3 in Table 1 was prepared and 3 wt % of Luster Pigment F in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 780° C. for 30 min in an electric furnace to form an overglaze (the overglaze layer was about 0.15 mm thick). The resulting overglaze was gold in color and had a texture that possessed surface gloss as well as luster, significantly differing from the texture of conventional gold mica overglazes.

The specular gloss (Gs 60°) of the surface was measured by using a VG2000 gloss meter manufactured by Nippon Denshoku Industries and was determined to be 69. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 125.7%.

Example 9

Frit 2 in Table 1 was prepared and 3 wt % of Luster Pigment G in Table 2 was added to the frit to prepare an overglaze paint for ceramics. To the overglaze paint, a resin (squeegee oil OS4330 manufactured by Goo Chemical) was added to form a paste, which was then processed into about 0.18 mm thick transfer paper by printing. The transfer paper was applied onto a surface of a ceramic and dried. Subsequently, the dried ceramic was fired by maintaining at 750° C. for 1 hour in an electric furnace to form an overglaze (the overglaze layer was about 0.15 mm thick). The resulting overglaze was gold in color and had a texture that possessed surface gloss as well as luster, significantly differing from the texture of conventional gold mica overglazes.

The specular gloss (Gs 60°) of the surface was measured by using a VG2000 gloss meter manufactured by Nippon Denshoku Industries and was determined to be 66.6. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 170.6%.

Example 10

Frit 1 in Table 1 was prepared and 1 wt % of Luster Pigment H in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 830° C. for 5 min in an electric furnace to form an overglaze (the overglaze layer was about 0.19 mm thick). The resulting overglaze was orange in color and had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 98.9. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 6.7%.

Example 11

Frit 2 in Table 1 was prepared and 0.3 wt % of Luster Pigment C in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 780° C. for 20 min in an electric furnace to form an overglaze (the overglaze layer was about 0.15 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 78.5. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 2.7%.

Example 12

Frit 4 in Table 1 was prepared and 0.5 wt % of Luster Pigment A in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 780° C. for 20 min in an electric furnace to form an overglaze (the overglaze layer was about 0.15 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 60.5. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 10.9%.

Example 13

Frit 5 in Table 1 was prepared. 1 wt % of Luster Pigment A in Table 2 and then 0.5 wt % of chromium oxide were added to the frit to prepare an overglaze paint for ceramics. To the overglaze paint, water and a resin (aqueous medium) were added to form a slurry, which was then applied onto a surface of a ceramic by spraying. After drying, the ceramic was fired by maintaining at 785° C. for 15 min in an electric furnace to form an overglaze (the overglaze layer was about 0.2 mm thick). The resulting overglaze was green in color and had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 83.8. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 5.1%.

Example 14

Frit 6 in Table 1 was prepared and 1 wt % of Luster Pigment C in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.10 mm thick). The resulting overglaze had a texture that possessed surface gloss as well as luster, not like any of conventional overglazes. The texture resembled the texture of metallic painting. The specular gloss (Gs 60°) of the surface was measured by using a VG2000 gloss meter manufactured by Nippon Denshoku Industries and was determined to be 70. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 3.5%.

Example 15

Frit 2 in Table 1 was prepared and 8 wt % of Luster Pigment E in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.15 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 75. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 55.4%.

Example 16

Frit 7 in Table 1 was prepared and 0.5 wt % of Luster Pigment C in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.15 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 65.1. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 5.6%.

Example 17

Frit 8 in Table 1 was prepared and 2 wt % of Luster Pigment A in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 780° C. for 20 min in an electric furnace to form an overglaze (the overglaze layer was about 0.10 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 74.4. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 51.1%.

Example 18

Frit 9 in Table 1 was prepared and 2 wt % of Luster Pigment A in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 15 min in an electric furnace to form an overglaze (the overglaze layer was about 0.10 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 88.3. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 7.3%.

Example 19

Frit 10 in Table 1 was prepared and 2 wt % of Luster Pigment A in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 15 min in an electric furnace to form an overglaze (the overglaze layer was about 0.10 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 79.6. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 15.0%.

Example 20

Frit 11 in Table 1 was prepared and 2 wt % of Luster Pigment A in Table 2 was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 780° C. for 20 min in an electric furnace to form an overglaze (the overglaze layer was about 0.10 mm thick). The resulting overglaze had a texture that possessed surface gloss as well as luster, not like any of conventional overglazes. The texture resembled the texture of metallic painting.

The specular gloss (Gs 60°) of the surface was measured by using a VG2000 gloss meter manufactured by Nippon Denshoku Industries and was determined to be 77.3. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 12.0%.

Example 21

Frit 3 in Table 1 was prepared and 2 wt % of Luster Pigment A in Table 2 was added to the frit to prepare an overglaze paint for ceramics. To the overglaze paint, water and an aggregating agent (EX Dami solution manufactured by Excel) were added to form a paste. Using a brush, the paste was then applied onto a glazed surface of a ceramic plate with a diameter of approximately 15 cm. After drying, the ceramic was fired by maintaining at 800° C. for 20 min in an electric furnace to form an overglaze (the overglaze layer was about 0.15 mm thick). The resulting overglaze formed over the plate had a texture that possessed surface gloss as well as luster, not like any of conventional overglazes. The texture resembled the texture of metallic painting.

Example 22

Frit 2 in Table 1 was prepared and 3 wt % of Luster Pigment G in Table 2 was added to the frit to prepare an overglaze paint for ceramics. To the overglaze paint, a resin (squeegee oil OS4330 manufactured by Goo Chemical) was added to form a paste, which was then processed into about 0.20 mm thick transfer paper (a star-shaped piece inscribed in a 6 cm circle) by printing. The transfer paper was applied over a glaze on the side surface of an approximately 200 ml porcelain tea cup and was dried. Subsequently, the dried ceramic was fired by maintaining at 800° C. for 20 min in an electric furnace to form an overglaze (the overglaze layer was about 0.15 mm thick). The resulting overglaze was gold in color and had a texture that possessed surface gloss as well as luster, significantly differing from the texture of conventional gold mica overglazes.

Example 23

Frit 1 in Table 1 was prepared and 1 wt % of Luster Pigment E in Table 2 was added to the frit to prepare an overglaze paint for ceramics. To the overglaze paint, a resin (squeegee oil OS4330 manufactured by Goo Chemical) was added to form a paste, which was then processed into about 0.20 mm thick transfer paper (a 5 cm circular piece) by printing. The transfer paper was applied over a deep blue overglaze applied on the side surface of an approximately 200 ml porcelain tea cup and was dried. Subsequently, the dried ceramic was fired by maintaining at 800° C. for 20 min in an electric furnace to form an overglaze (the overglaze layer was about 0.15 mm thick). The underlying deep blue overglaze caused the resulting overglaze to develop a blue color. The overglaze had a texture that possessed surface gloss as well as luster, not like any of conventional overglazes. The texture resembled the texture of metallic painting.

Example 24

Frit 1 in Table 1 was prepared and 2 wt % of Luster Pigment E in Table 2 was added to the frit to prepare an overglaze paint for ceramics. To the overglaze paint, a resin (squeegee oil OS4330 manufactured by Goo Chemical) was added to form a paste, which was then processed into about 0.20 mm thick transfer paper (a 10 cm circular piece) by printing. The transfer paper was applied over the surface (entire surface) of a deep blue glaze of a ceramic plate with a diameter of approximately 10 cm and was dried. Subsequently, the dried ceramic was fired by maintaining at 790° C. for 20 min in an electric furnace to form an overglaze (the overglaze layer was about 0.15 mm thick). The underlying deep blue glaze caused the resulting overglaze to develop a blue color. The overglaze had a texture that possessed surface gloss as well as luster, not like any of conventional overglazes. The texture resembled the texture of metallic painting.

Comparative Example 1

Frit 1 in Table 1 was prepared and was used to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.15 mm thick). The resulting overglaze had normal colorless gloss with no metallic luster.

The specular gloss (Gs 60°) of the surface was measured by using a VG2000 gloss meter manufactured by Nippon Denshoku Industries and was determined to be 94. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was decreased from the luminous reflectance $Y_{(0)}$ at a light receiving angle of 0° and the percent change in reflectance $Y_{(0\text{-}30)}$ between light receiving angles of 0° and 30° was −10.0%.

Comparative Example 2

Frit 1 in Table 1 was prepared and 2 wt % of a commercially available yellow pigment for ceramics (zircon praseodymium yellow) was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.15 mm thick). The resulting overglaze had normal yellow gloss with no metallic luster.

The specular gloss (Gs 60°) of the surface was measured by using a VG2000 gloss meter manufactured by Nippon Denshoku Industries and was determined to be 93.8. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was decreased from the luminous reflectance $Y_{(0)}$ at a light receiving angle of 0° and the percent change in reflectance $Y_{(0\text{-}30)}$ between light receiving angles of 0° and 30° was −9.6%.

Comparative Example 3

Frit 1 in Table 1 was prepared and 2 wt % of a commercially available blue pigment for ceramics was added to the frit to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.15 mm thick). The resulting overglaze had normal blue gloss with no metallic luster.

The specular gloss (Gs 60°) of the surface was measured by using a VG2000 gloss meter manufactured by Nippon Denshoku Industries and was determined to be 97.1. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was decreased from the luminous reflectance $Y_{(0)}$ at a light receiving angle of 0° and the percent change in reflectance $Y_{(0\text{-}30)}$ between light receiving angles of 0° and 30° was −10.2%.

Comparative Example 4

To a commercially available overglaze frit (EXA040 manufactured by Excel), 2 wt % of Luster Pigment A in Table 2 was added to prepare an overglaze paint for ceramics. To the overglaze paint, water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze (the overglaze layer was about 0.15 mm thick). The resulting overglaze had normal colorless gloss with no metallic luster.

The specular gloss (Gs 60°) of the surface was measured by using a VG2000 gloss meter manufactured by Nippon Denshoku Industries and was determined to be 92.3. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was decreased from the luminous reflectance $Y_{(0)}$ at a light receiving angle of 0° and the percent change in reflectance $Y_{(0\text{-}30)}$ between light receiving angles of 0° and 30° was −9.8%.

Comparative Example 5

To a commercially available gold mica overglaze paint (Lead-Free Metallic 01 manufactured by Isekyu), water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze. The resulting overglaze was a matte overglaze having a gold luster and a low surface gloss (Prior art product).

The specular gloss (Gs 60°) of the surface was measured by using a VG2000 gloss meter manufactured by Nippon Denshoku Industries and was determined to be 15.1. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0\text{-}30)}$ between light receiving angles of 0° and 30° was 288.3%.

Comparative Example 6

To a commercially available silver mica overglaze paint (Lead-Free Metallic 12 manufactured by Isekyu), water and an aggregating agent (EX Dami solution manufactured by Excel) were added to form a paste, which was then applied onto a surface of a ceramic using a brush. After drying, the ceramic was fired by maintaining at 800° C. for 20 min in an electric furnace to form an overglaze. The resulting overglaze was a matte overglaze having a silver luster and a low surface gloss (Prior art product).

The specular gloss (Gs 60°) of the surface was measured by using a VG2000 gloss meter manufactured by Nippon Denshoku Industries and was determined to be 18.9. Using a variable angle spectrophotometer GC 5000 manufactured by Nippon Denshoku Industries, light was irradiated onto the surface of the overglaze sample at an incident angle of −45° and the luminous reflectance (Y) of the sample was measured by varying the light receiving angle from −20° to 30° at 5-degree increments.

As a result, it turned out that the luminous reflectance $Y_{(30)}$ at a light receiving angle of 30° was increased from the luminous reflectance $Y_{(0)}$ at a light receiving angle of 0° and the percent change in reflectance $Y_{(0-30)}$ between light receiving angles of 0° and 30° was 201.7%.

vided by the pigment manufacturers. The average particle size (d50) is data obtained by using LMS-2000e, a laser diffraction/scattering size distribution measurement instrument manufactured by Seishin Enterprise with the particle refraction index set to 1.7 and the particle absorbance to 0.1. In the present specification, the d50 value based on the measurement is used as a measure of the particle size distribution (size distribution) of the luster pigments.

Table 4 shows compositions of Luster Pigments A through H. The compositions of Luster Pigments A through F and H show values measured for each production lot. On the other hand, since values measured for each production lot as described above were not available for Luster Pigment G, a quantitative analysis was conducted on Luster Pigment G by

TABLE 1

| Sample name | Average particle size (d50) [μm] | Composition (wt %) | | | | | | | | | | |
|---|---|---|---|---|---|---|---|---|---|---|---|---|
| | | $SiO_2$ | $Al_2O_3$ | CaO | $Na_2O$ | $K_2O$ | ZnO | BaO | SrO | $B_2O_3$ | $ZrO_2$ | $Li_2O$ |
| Frit 1 | 14.3 | 47.3 | 4.0 | 1.1 | 0.0 | 10.2 | 3.2 | 4.5 | 0.0 | 24.8 | 4.9 | 0.0 |
| Frit 2 | 18.7 | 46.2 | 4.1 | 1.2 | 0.6 | 9.5 | 3.3 | 4.7 | 0.0 | 25.4 | 5.0 | 0.0 |
| Frit 3 | 16.8 | 47.5 | 4.0 | 1.7 | 0.0 | 9.3 | 3.2 | 4.5 | 0.0 | 24.8 | 5.0 | 0.0 |
| Frit 4 | 17.8 | 49.4 | 0.2 | 1.7 | 0.0 | 9.7 | 3.4 | 4.7 | 0.0 | 25.8 | 5.1 | 0.0 |
| Frit 5 | 19.5 | 43.7 | 3.2 | 1.8 | 1.3 | 6.9 | 4.2 | 4.8 | 0.0 | 29.0 | 5.1 | 0.0 |
| Frit 6 | 18.0 | 48.5 | 4.1 | 0.0 | 3.1 | 6.7 | 4.1 | 0.0 | 3.1 | 25.4 | 5.0 | 0.0 |
| Frit 7 | 12.3 | 48.4 | 3.2 | 1.8 | 0.7 | 8.0 | 4.3 | 4.9 | 0.0 | 23.5 | 5.2 | 0.0 |
| Frit 8 | 14.1 | 45.9 | 4.3 | 1.2 | 0.0 | 13.0 | 3.5 | 1.6 | 0.0 | 25.2 | 5.3 | 0.0 |
| Frit 9 | 13.5 | 52.7 | 3.9 | 1.1 | 0.2 | 9.0 | 3.1 | 3.0 | 0.0 | 21.7 | 4.7 | 0.6 |
| Frit 10 | 16.6 | 54.1 | 2.9 | 0.1 | 1.7 | 7.9 | 3.0 | 2.9 | 0.0 | 22.2 | 4.6 | 0.6 |
| Frit 11 | 14.8 | 44.8 | 6.3 | 0.6 | 0.0 | 13.7 | 3.4 | 1.6 | 0.0 | 24.5 | 5.1 | 0.0 |

TABLE 2

| Sample Name | Pigment Manufacturer |
|---|---|
| Luster Pigment A | Merck iriodin 6163 |
| Luster Pigment B | Merck iriodin 163 |
| Luster Pigment C | Merck iriodin 183 |
| Luster Pigment D | Merck iriodin 6153 |
| Luster Pigment E | Merck miraval 5402 |
| Luster Pigment F | Merck iriodin 325 |
| Luster Pigment G | Merck Xirallic NXTM260-30 |
| Luster Pigment H | Merck iriodin 4504 |

Figure 5:
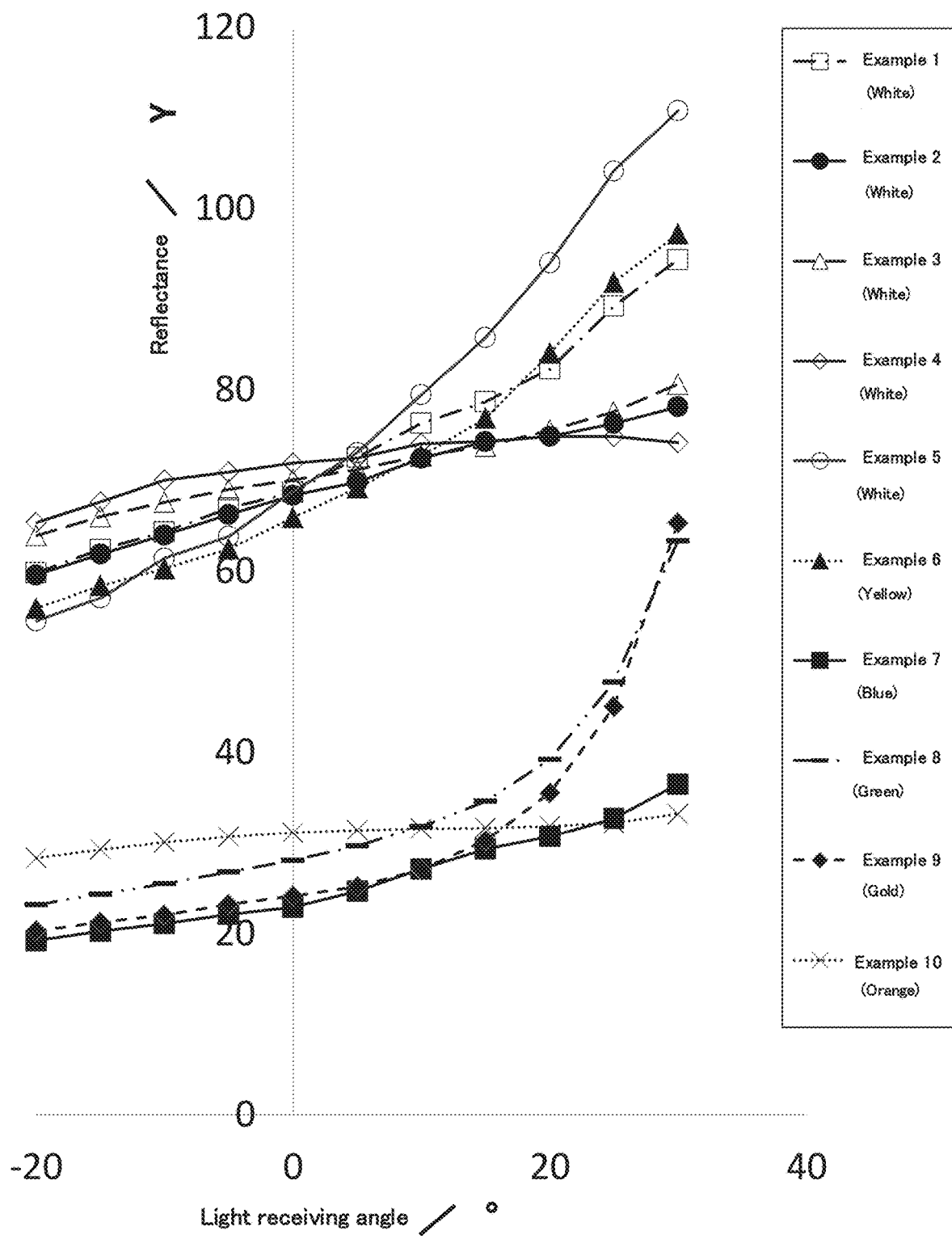
FIG. 5 is a diagram showing the results of measurement of the variable angle luminous intensity distribution in Examples 1 through 10 of the present invention (1).
Figure 6:
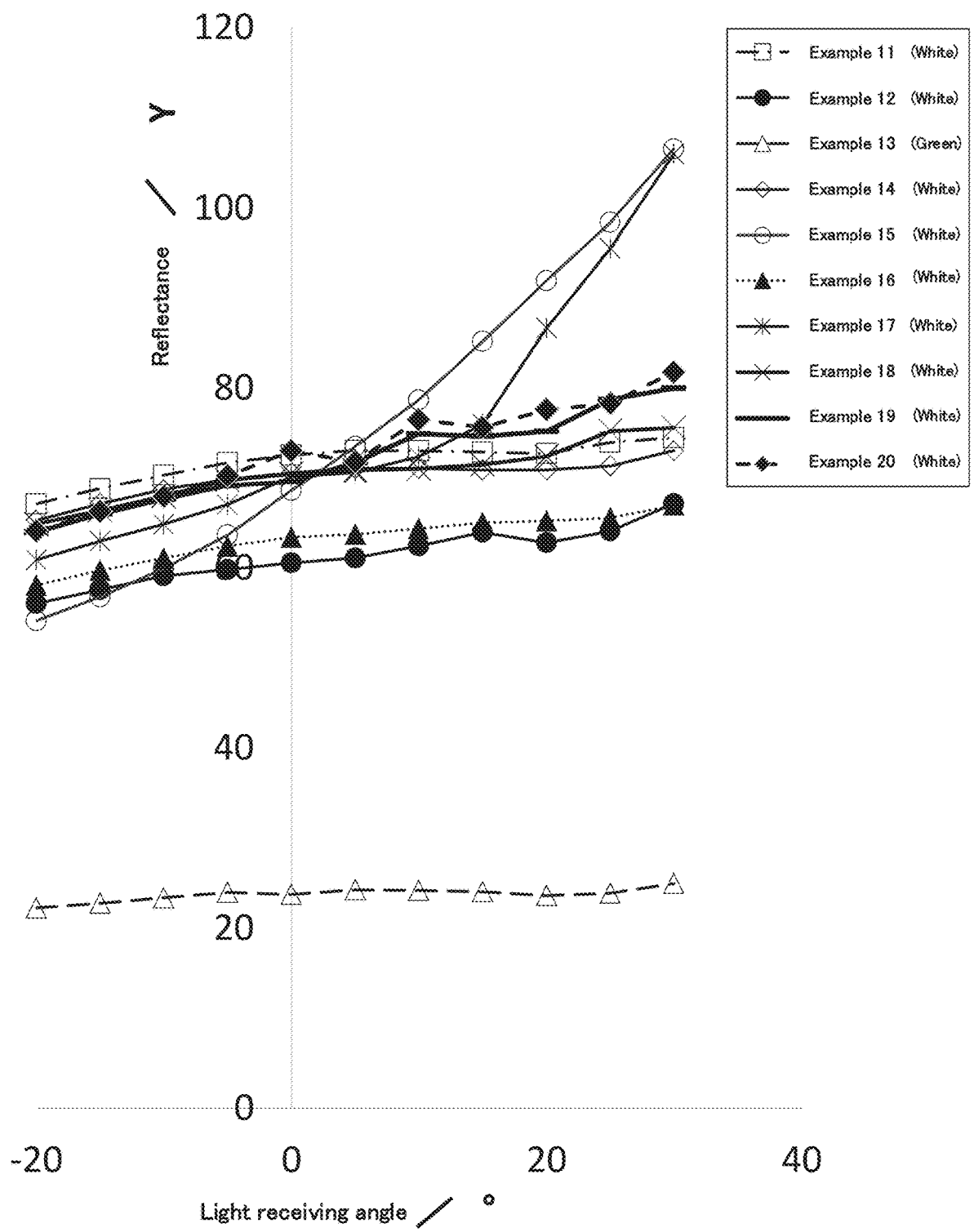
FIG. 6 is a diagram showing the results of measurement of the variable angle luminous intensity distribution in Examples 11 through 20 (2).
Figure 7:
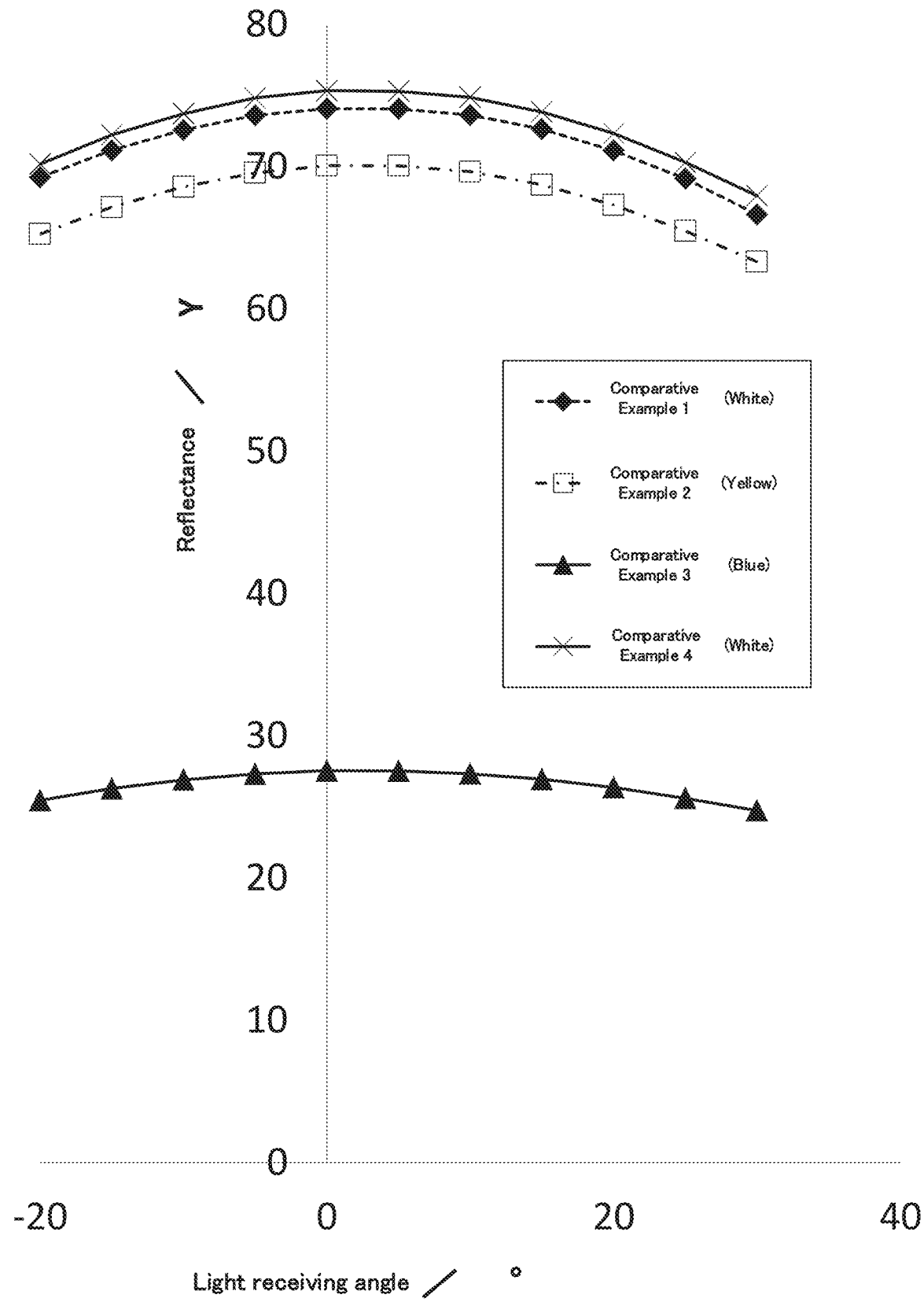
FIG. 7 is a diagram showing the results of measurement of the variable angle luminous intensity distribution in Comparative Examples 1 through 4.

FIG. 5 is a diagram showing the results of measurement of the variable angle luminous intensity distribution in Examples 1 through 10 of the present invention (1) whereas FIG. 6 is a diagram showing the results of measurement of the variable angle luminous intensity distribution in Examples 11 through 20 of the present invention (1). FIG. 7 is a diagram showing the results of measurement of the variable angle luminous intensity distribution in Comparative Examples 1 through 4.

As shown in FIGS. 5 and 6, the overglaze samples containing a metallic luster pigment, which represent Examples of the present invention, had increased reflectance at a light receiving angle of 30° from the reflectance at a light receiving angle of 0°.

In contrast, as shown in FIG. 7, the overglaze samples with no metallic luster or metallic luster look (Comparative Examples) had decreased reflectance at a light receiving angle of 30° from the reflectance at a light receiving angle of 0°.

The properties of Luster Pigments A through H will now be described in more details. Table 3 shows data for Luster Pigments A through H. Specifically, "particle size range" and "average particle size (d50)" are presented in Table 3. The particle size ranges are based on catalog values prothe fundamental parameter method using ZSX Primus II, an X-ray fluorescence spectrometer manufactured by Rigaku. In this quantitative analysis, a 0.4 g sample of Luster Pigment G was mixed with 3 g of lithium tetraborate as a dissolving agent, and the mixture was heated at 1200° C. for 4 min to prepare glass beads, which were then loaded on the spectrometer for measurement.

In the present invention, the factors such as shape, size distribution, average particle size, and optical properties are believed to be major contributors to the effects responsible for the metallic luster look. Thus, it should be appreciated that the present invention is not limited to compositions of the luster pigments.

The luster pigments in the present invention may also be considered to be those that do not dissolve when added to a frit prepared for the present invention and heated to about 800° C. (at most 830° C.)

TABLE 3

| | Particle Size (μm) | |
|---|---|---|
| Sample Name | Particle Size Range | Average Particle Size (d50) |
| Luster Pigment A | 20-180 | 81.9 |
| Luster Pigment B | 20-180 | 63.2 |
| Luster Pigment C | 45-500 | 68.5 |
| Luster Pigment D | 20-100 | 45.7 |
| Luster Pigment E | 20-200 | 73.5 |
| Luster Pigment F | 5-25 | 12.3 |
| Luster Pigment G | 5-30 | 18.6 |
| Luster Pigment H | 5-50 | 19.3 |

TABLE 4

| Sample Name | Composition (wt %) | | | | | | |
|---|---|---|---|---|---|---|---|
| | Mica | TiO$_2$ | SnO$_2$ | SiO$_2$ | Borosilicate glass | Fe$_2$O$_3$ | Al$_2$O$_3$ |
| Luster Pigment A | 87.6 | 11.6 | 0.8 | — | — | — | — |
| Luster Pigment B | 86.5 | 13.3 | 0.2 | — | — | — | — |
| Luster Pigment C | 92.0 | 7.8 | 0.2 | — | — | — | — |
| Luster Pigment D | 81.7 | 16.6 | 1.7 | — | — | — | — |
| Luster Pigment E | — | 15.0 | 1.1 | 26.0 | 57.9 | — | — |
| Luster Pigment F | 31.0 | 21.0 | 1.0 | 12.0 | — | 35.0 | — |
| Luster Pigment G | — | 20.7 | 2.4 | 1.0 | — | 35.0 | 40.9 |
| Luster Pigment H | — | — | — | 45.6 | — | 54.4 | — |

According to the overglaze decoration material in accordance with the present invention as described above, the luster pigments do not dissolve in high temperature glass and can thus maintain their luster property at overglaze firing temperatures used for ceramic products (approximately 800° C.) As a result, ceramic products can be provided that have a metallic texture and have a luster overglaze with surface gloss applied thereto.

Further, the overglaze decoration material in accordance with the present invention enables provision of ceramic products having metallic luster that maintain a high surface gloss, are less likely to accumulate dirt and grime on the surface thereof, and that can be used as eating utensils.

Moreover, the ceramic products in accordance with the present invention are ceramic products that possess a "metallic" texture and have a luster overglaze with surface gloss applied thereto.

In addition, the production methods for the ceramic products in accordance with the present invention enable production of ceramic products that possess a "metallic" texture and have a luster overglaze with surface gloss applied thereto.

What is claimed is:

1. A ceramic product comprising:
   a product made of ceramic, and
   a glass layer applied onto the product and comprising 0.1 wt % to 9 wt % of a luster pigment for providing a metallic look,
   wherein the glass layer further comprises 40 wt % to 60 wt % of silicon dioxide,
   15 wt % to 35 wt % of boron oxide,
   18 wt % or less of alkali metal oxides consisting of lithium oxide, sodium oxide, and potassium oxide,
   4 wt % or less of alkali metal oxides consisting of lithium oxide and sodium oxide, and
   5 wt % or more of potassium oxide.

2. The ceramic product according to claim 1, wherein the glass layer further comprises a non-luster pigment.

3. The ceramic product according to claim 1, wherein the glass layer further comprises a chromogenic metal compound.

4. The ceramic product according to claim 1, wherein the luster pigment comprises plate-shaped particles, and/or plate-shaped particles coated with one or more oxides selected from the group consisting of titanium oxide, ferric oxide, silicon oxide, tin oxide, and zirconium oxide.

5. The ceramic product according to claim 4, wherein the plate-shaped particles are one or more selected from the group consisting of mica, silicon oxide, aluminum oxide, and borosilicate glass.

6. The ceramic product according to claim 1, wherein a surface of the glass layer has a specular gloss value (Gs60°) of 60 or higher, and a value of luminous reflectance Y at a light receiving angle of 30° is increased from the value of luminous reflectance Y at a light receiving angle of 0° in a variable angle luminous intensity distribution measured at an incident light angle of −45°.

7. The ceramic product according to claim 1, wherein the glass layer consists essentially of:
   0.1 wt % to 9 wt % of the luster pigment for providing the metallic look,
   40 wt % to 60 wt % of silicon dioxide,
   15 wt % to 35 wt % of boron oxide,
   18 wt % or less of alkali metal oxides consisting of lithium oxide, sodium oxide, and potassium oxide,
   4 wt % or less of alkali metal oxides consisting of lithium oxide and sodium oxide, and
   5 wt % or more of potassium oxide.

* * * * *